(12) United States Patent
Dariavach et al.

(10) Patent No.: US 9,631,842 B1
(45) Date of Patent: Apr. 25, 2017

(54) MAGNETO-CALORIC COOLING SYSTEM

(75) Inventors: Nader G. Dariavach, Middleboro, MA (US); Jin Liang, Southborough, MA (US); Gordon O. Barr, Fall River, MA (US); Paul T. Callahan, Acton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 746 days.

(21) Appl. No.: 13/308,402

(22) Filed: Nov. 30, 2011

(51) Int. Cl.
*F25B 21/00* (2006.01)

(52) U.S. Cl.
CPC .................................. *F25B 21/00* (2013.01)

(58) Field of Classification Search
CPC .... F25B 21/00; F25B 2321/002; Y02B 30/66; H01F 1/015
USPC ...... 62/50.2, 51.3, 66, 67, 293, 3.1, 3.2, 3.3, 62/3.7
See application file for complete search history.

(56) References Cited

U.S. PATENT DOCUMENTS

| | | | | |
|---|---|---|---|---|
| 3,108,444 | A * | 10/1963 | Kahn | 62/3.1 |
| 4,033,734 | A * | 7/1977 | Steyert et al. | 62/3.1 |
| 4,532,770 | A | 8/1985 | Hakuraku et al. | |
| 4,702,090 | A * | 10/1987 | Barclay et al. | 62/3.3 |
| 5,091,361 | A * | 2/1992 | Hed | 505/163 |
| 5,934,078 | A * | 8/1999 | Lawton et al. | 62/3.1 |
| 6,467,274 | B2 * | 10/2002 | Barclay et al. | 62/3.1 |
| 6,588,216 | B1 * | 7/2003 | Ghoshal | 62/3.1 |
| 6,826,915 | B2 * | 12/2004 | Wada et al. | 62/3.1 |
| 6,845,622 | B2 * | 1/2005 | Sauciuc | F25B 21/02 165/104.21 |
| 6,946,941 | B2 * | 9/2005 | Chell | 335/306 |
| 7,481,064 | B2 * | 1/2009 | Kitanovski | F25B 21/00 62/3.1 |
| 7,552,592 | B2 * | 6/2009 | Iwasaki et al. | 62/3.1 |
| 7,650,756 | B2 * | 1/2010 | Muller et al. | 62/3.1 |
| 8,099,964 | B2 * | 1/2012 | Saito et al. | 62/3.1 |
| 8,375,727 | B2 * | 2/2013 | Sohn | 62/3.1 |
| 8,453,466 | B2 * | 6/2013 | Chang et al. | 62/3.1 |
| 8,656,725 | B2 * | 2/2014 | Muller et al. | 62/3.1 |
| 8,820,093 | B2 * | 9/2014 | Heitzler et al. | 62/3.1 |
| 2004/0182086 | A1 * | 9/2004 | Chiang et al. | 62/3.1 |
| 2004/0231338 | A1 * | 11/2004 | Saito et al. | 62/3.1 |
| 2005/0022538 | A1 * | 2/2005 | Takagi | 62/3.1 |
| 2005/0217278 | A1 * | 10/2005 | Mongia et al. | 62/3.1 |
| 2006/0090474 | A1 * | 5/2006 | Sauciuc et al. | 62/3.2 |
| 2007/0130960 | A1 * | 6/2007 | Muller et al. | 62/3.1 |
| 2007/0144181 | A1 | 6/2007 | Kitanovski | |
| 2008/0276623 | A1 | 11/2008 | Ali et al. | |
| 2009/0151363 | A1 * | 6/2009 | Sari et al. | 62/3.3 |
| 2009/0266083 | A1 * | 10/2009 | Shin et al. | 62/3.1 |
| 2009/0308079 | A1 * | 12/2009 | Lee | 62/3.1 |
| 2009/0308080 | A1 * | 12/2009 | Han et al. | 62/3.1 |

(Continued)

*Primary Examiner* — Jianying Atkisson
*Assistant Examiner* — Joel Attey
(74) *Attorney, Agent, or Firm* — Brian J. Colandreo; Mark H. Whittenberger; Holland & Knight LLP

(57) ABSTRACT

A magneto-caloric cooling system includes an energy absorption area configured to be positioned proximate a thermal energy producing device. At least one energy dissipation area is configured to be positioned proximate a thermal energy dissipation device. A thermal energy transfer device is configured to be cycled between the energy absorption area and the energy dissipation area. A magnetic field generation device is configured to produce a magnetic field proximate the energy dissipation area.

19 Claims, 3 Drawing Sheets

(56) References Cited

U.S. PATENT DOCUMENTS

| | | |
|---|---|---|
| 2010/0107654 A1* | 5/2010 | Rowe et al. .................... 62/3.1 |
| 2010/0276627 A1* | 11/2010 | Mazet ...................... 252/62.55 |
| 2011/0061398 A1* | 3/2011 | Shih et al. ..................... 62/3.1 |
| 2011/0289937 A1 | 12/2011 | Muller et al. |
| 2011/0302930 A1 | 12/2011 | Sohn |
| 2011/0302931 A1 | 12/2011 | Sohn |
| 2011/0314836 A1 | 12/2011 | Heitzler et al. |

* cited by examiner

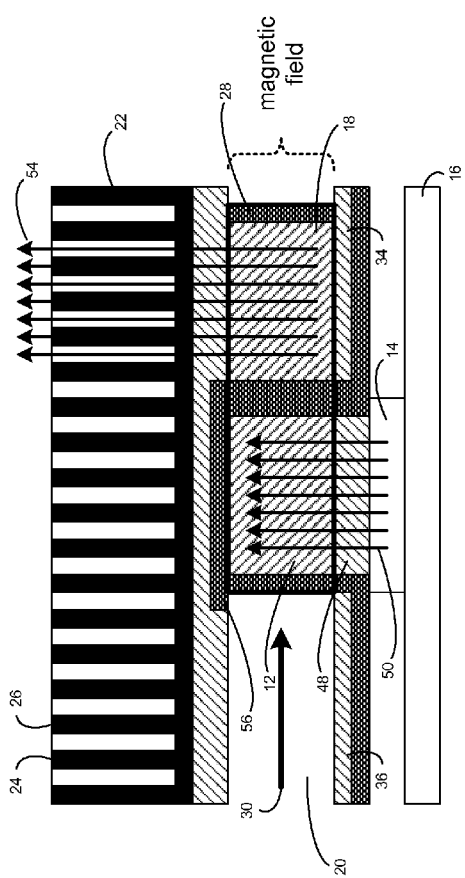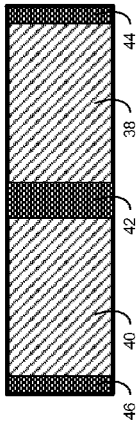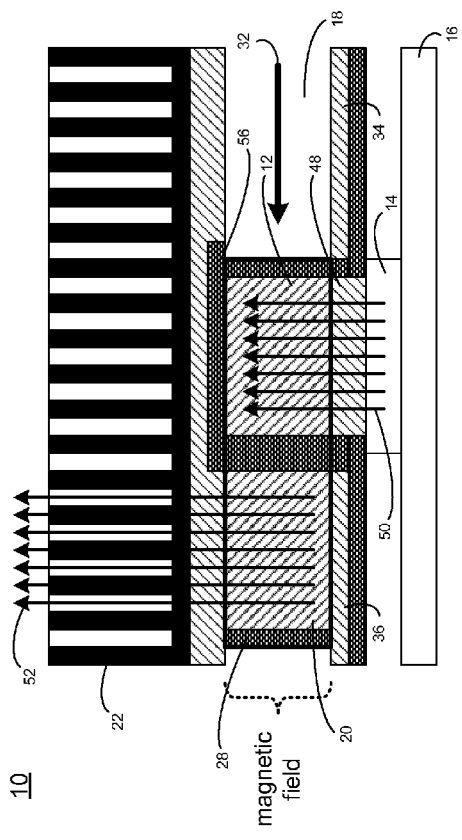

MAGNETO-CALORIC COOLING SYSTEM

TECHNICAL FIELD

This disclosure relates to cooling systems and, more particularly, to magneto-caloric cooling systems.

BACKGROUND

As electronic devices become more powerful, the amount of heat these devices generate increases accordingly. For example, as system clock rates continue to rise, more elaborate procedures are required to maintain the appropriate operating temperature for these electronic devices.

Various methodologies were employed in the past. For example, traditional heatsinks were attached to microprocessors to remove heat from these devices. As microprocessor design advanced and these devices generated more heat, heatsinks with built-in cooling fans were employed to increase the amount of convective cooling provided by the heatsink. Further, large cooling fans were employed to move volumes of air through computer chasses in order to remove heat from these systems. Additionally, active cooling using remote heatsinks with heat pipes, thermoelectric and water-based cooling systems were often employed to provide an additional level of cooling.

SUMMARY OF DISCLOSURE

In a first implementation, a magneto-caloric cooling system includes an energy absorption area configured to be positioned proximate a thermal energy producing device. At least one energy dissipation area is configured to be positioned proximate a thermal energy dissipation device. A thermal energy transfer device is configured to be cycled between the energy absorption area and the energy dissipation area. A magnetic field generation device is configured to produce a magnetic field proximate the energy dissipation area.

One or more of the following features may be included. The magnetic field generation device may be configured to produce the magnetic field when the thermal energy transfer device is positioned within the energy dissipation area. The thermal energy dissipation device may include a heat sink. The thermal energy producing device may include an electronic component. The electronic component may include a microprocessor.

The thermal energy transfer device may be constructed of a magnetic-field-responsive material. The magnetic field responsive material may include a magnetorefrigerant. The magnetorefrigerant may include Gadolinium-based compounds.

The thermal energy transfer device may be configured to warm when exposed to the magnetic field produced by the magnetic field generation device. The thermal energy transfer device may include a first thermal energy transfer portion and a second thermal energy transfer portion, wherein the first and second thermally energy transfer portions are separated by an insulating divider. An insulating layer may be positioned between the energy absorption area and the energy dissipation area. The at least one energy dissipation area may include a first energy dissipation area and a second energy dissipation area.

The first thermal energy transfer portion may be configured to be positioned within the first energy dissipation area while the second thermal energy transfer portion is positioned within the energy absorption area. The second thermal energy transfer portion may be configured to be positioned within the second energy dissipation area while the first thermal energy transfer portion is positioned within the energy absorption area.

In another implementation, a magneto-caloric cooling system includes an energy absorption area configured to be positioned proximate a thermal energy producing device. At least one energy dissipation area is configured to be positioned proximate a thermal energy dissipation device. The at least one energy dissipation area includes a first energy dissipation area and a second energy dissipation area. The thermal energy dissipation device includes a heat sink. A thermal energy transfer device is configured to be cycled between the energy absorption area and the energy dissipation area. The thermal energy transfer device includes a first thermal energy transfer portion and a second thermal energy transfer portion. The first and second thermally energy transfer portions are separated by an insulating divider. A magnetic field generation device is configured to produce a magnetic field proximate the energy dissipation area.

One or more of the following features may be included. The first thermal energy transfer portion may be configured to be positioned within the first energy dissipation area while the second thermal energy transfer portion is positioned within the energy absorption area. The second thermal energy transfer portion may be configured to be positioned within the second energy dissipation area while the first thermal energy transfer portion is positioned within the energy absorption area.

The magnetic field generation device may be configured to produce the magnetic field when the thermal energy transfer device is positioned within the energy dissipation area. The thermal energy producing device may include an electronic component.

In another implementation, an energy absorption area is configured to be positioned proximate a thermal energy producing device. The thermal energy producing device includes an electronic component. At least one energy dissipation area is configured to be positioned proximate a thermal energy dissipation device. The thermal energy dissipation device includes a heat sink. A thermal energy transfer device is configured to be cycled between the energy absorption area and the energy dissipation area. A magnetic field generation device is configured to produce a magnetic field proximate the energy dissipation area.

One or more of the following features may be included. The magnetic field generation device may be configured to produce the magnetic field when the thermal energy transfer device is positioned within the energy dissipation area. The thermal energy transfer device may be constructed of a magnetic-field-responsive material. The magnetic field responsive material may include a magnetorefrigerant. The magnetorefrigerant may include Gadolinium-based compounds.

The details of one or more implementations are set forth in the accompanying drawings and the description below. Other features and advantages will become apparent from the description, the drawings, and the claims.

BRIEF DESCRIPTION OF THE DRAWINGS

FIG. 1 is a diagrammatic view of a magneto-caloric cooling system;

FIG. 2 is an alternative diagrammatic view of the magneto-caloric cooling system of FIG. 1;

FIG. 3 is a detail view of a portion of the magneto-caloric cooling system of FIG. 1;

Like reference symbols in the various drawings indicate like elements.

DETAILED DESCRIPTION OF THE PREFERRED EMBODIMENTS

Figure 4:
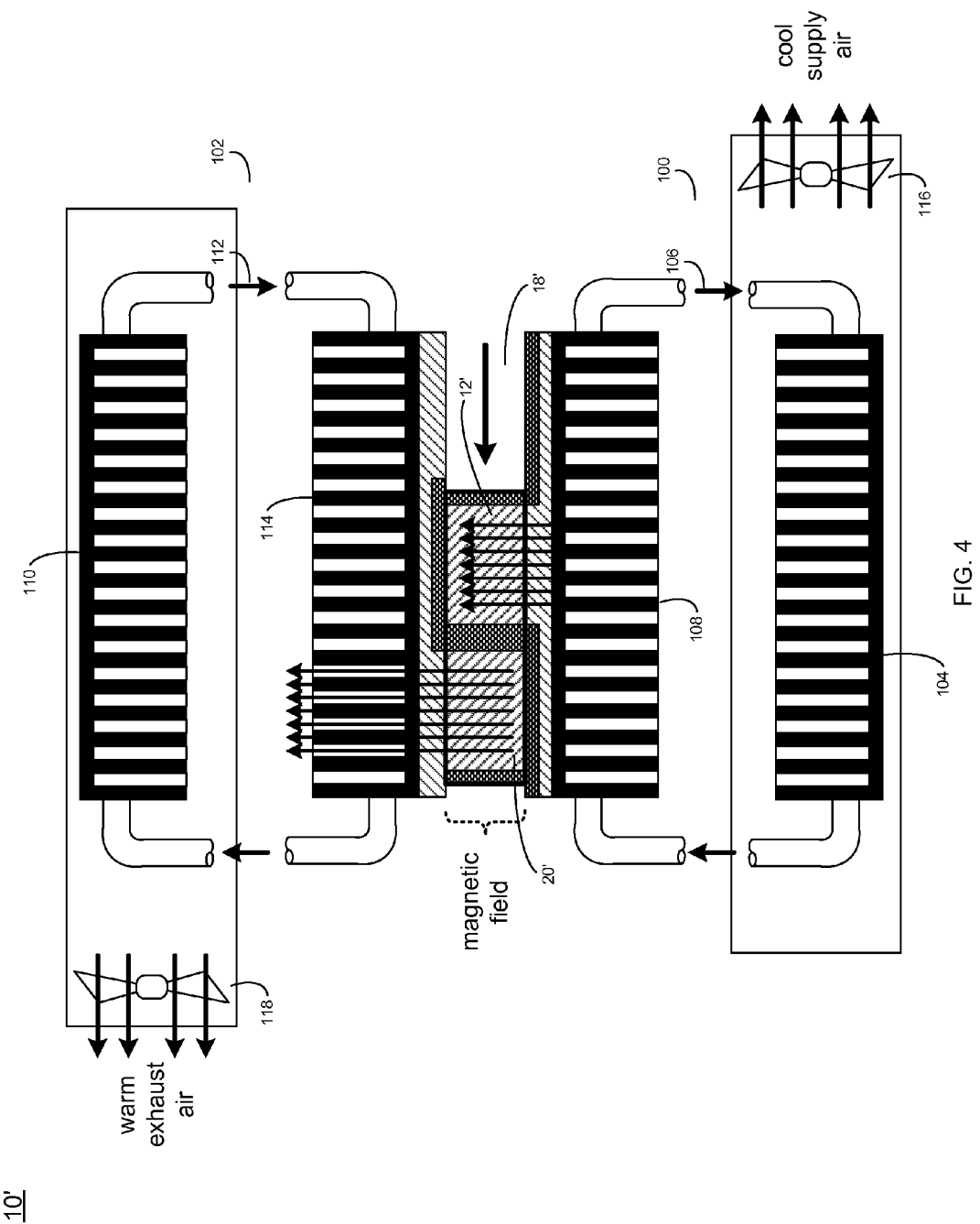
FIG. 4 is a diagrammatic view of an alternative embodiment of the magneto-caloric cooling system of FIG. 1.

System Overview:

Referring also to FIGS. 1-2, there is shown magneto-caloric cooling system 10. As is known in the art, certain types of metals experience a temperature increase when exposed to a magnetic field and experience a corresponding temperature decrease when the metal is demagnetized. Magneto-caloric cooling system 10 is a cooling system that exploits this phenomenon and allows for convenient low-power cooling of electronic devices.

Magneto-caloric cooling system 10 may include energy absorption area 12 that is configured to be positioned proximate thermal energy producing device 14 (e.g., an electronic component). For this particular example, assume that thermal energy producing device 14 is a microprocessor that is mounted on printed circuit board 16. Examples of printed circuit board 16 may include any traditional circuit board that is mounted in e.g. a computing system.

Magneto-caloric cooling system 10 may also include at least one energy dissipation area, examples of which may include but are not limited to first energy dissipation area 18 and second energy dissipation area 20. These energy dissipation areas may be configured to be positioned proximate thermal energy dissipation device 22. For this particular example, assume that thermal energy dissipation device 22 is a heat sink. As is known in the art, a heat sink is a device that is used to dissipate heat. Heat sinks may include a plurality of fins (e.g. fins 24, 26) that allow for the dissipation of heat from the surface of the heat sink. Depending on the particular type of heat sink, a fan (not shown) may be used to move air across the plurality of fins (e.g., fins 24, 26) to enhance the convective cooling of the heat sink. Accordingly, by blowing cool air across fins 24, 26, the cool air may absorb the heat within these fins, thus cooling the device to which the heat sink is attached.

Magneto-caloric cooling system 10 may also include thermal energy transfer device 28, which is shown in detail in FIG. 3. Thermal energy transfer device 28 may be configured to be cycled between the energy absorption areas (e.g. first energy absorption area 18 and second energy dissipation area 20). For example, thermal energy transfer device 28 may first be moved in the direction of arrow 30 and may subsequently be moved in the direction of arrow 32. The movement of thermal energy transfer device 28 may be effectuated through the use of some kind of reciprocating linkage assembly (not shown) that is actuated by a motor assembly (not shown). Additionally, the rate at which thermal energy transfer device 28 is cycled may vary depending upon several factors such as e.g. the mass of thermal energy transfer device 28, the efficiency of thermal energy transfer device 28, the quantity of heat generated by thermal energy producing device 14, and the efficiency of thermal energy dissipation device 22.

A magnetic field generation device may be configured to produce a magnetic field (not shown) proximate the energy dissipation areas. As discussed above, magneto-caloric cooling system 10 may include two energy dissipation areas, namely first energy dissipation area 18 and second energy dissipation area 20. Accordingly, magneto-caloric cooling system 10 may include first magnetic field generation device 34 and second magnetic field generation device 36. Magnetic field generation devices 34, 36 may be configured to produce the above-referenced magnetic fields whenever thermal energy transfer device 28 is positioned within energy dissipation areas 18, 20. Examples of magnetic field generation devices 34, 36 may include any device capable of generating a magnetic field, such as a wound coil assembly in combination with a current supply.

Thermal energy transfer device 28 may include first thermal energy transfer portion 38 and second thermal energy transfer portion 40, wherein first and second thermally energy transfer portions 38, 40 are separated by insulating divider 42. Insulating divider 42 may be constructed of various materials, examples of which may include but are not limited to calcium silicate based thermal insulation materials.

Thermal energy transfer device may be constructed, in whole or in part, of a magnetic field responsive material. Examples of such a magnetic field responsive material may include but are not limited to a magnetorefrigerant (e.g., Gadolinium based compounds such as $Gd_5(Si,Ge)_4$). As is known in the art, magnetic field responsive materials (such as a magnetorefrigerant) may be configured to warm when exposed to a magnetic field and cool down when the magnetic field is decreased or removed. Accordingly, as thermal energy transfer device 28 is constructed of such a magnetic field responsive material, thermal energy transfer device 28 may be configured to warm when exposed to the magnetic fields (not shown) produced by magnetic field generation devices 34, 36.

As discussed above and in this example, thermal energy transfer device 28 is shown to include first thermal energy transfer portion 38 and second thermal energy transfer portion 40, separated by insulating divider 42. Additionally and in this particular embodiment, thermal energy transfer device 28 is shown to include first insulating layer 44 and second insulating layer 46, which may function as an insulating layer between energy absorption area 12 and the energy dissipation areas (e.g., first energy dissipation area 18 and second energy dissipation area 20) when thermal energy transfer device 28 is appropriately positioned. Accordingly, first thermal energy transfer portion 38 is insulated by a combination of first insulating layer 44 and insulating divider 42. Further, second thermal energy transfer portion 40 is insulated by a combination of second insulating layer 46 and insulating divider 42. Insulating layers 44, 46 may be constructed of various materials, examples of which may include but are not limited to calcium silicate based thermal insulation materials.

Further and as discussed in this example, during operation of magneto-caloric cooling system 10, thermal energy transfer device 28 may be configured to cycle between a first position (as shown in FIG. 1) and a second position (as shown in FIG. 2). Accordingly, assume for illustrative purposes that the device to which magneto-caloric cooling system 10 is connected was powered off and therefore FIG. 1 is representative of a startup condition in which all components shown within this figure are at room temperature. When positioned as shown in FIG. 1, first thermal energy transfer portion 38 is positioned within first energy dissipation area 18 and second thermal energy transfer portion 40 is positioned within energy absorption area 12. Assume for illustrative purposes that thermal energy producing device 14 is powered up and is now in operation and generating a considerable quantity of thermal energy.

Assume that conductive plate 48 is positioned on top of thermal energy producing device 14 and some form of e.g. thermally conductive grease is used to fill in any air gaps between conductive plate 48 and thermal energy producing device 14. Examples of such a thermally conductive grease may include but are not limited to silver filled conductive grease.

Conductive plate 48 may be constructed of various thermally conductive materials, examples of which may include but are not limited to aluminum. Accordingly, thermal energy produced by thermal energy producing device 14 may travel upward (in the direction of arrows 50) through conductive plate 48 and into second thermal energy transfer portion 40. Therefore, while positioned as shown in FIG. 1, second thermal energy transfer portion 40 may wick away thermal energy from thermal energy producing device 14, resulting in the cooling of thermal energy producing device 14 and the warming of second thermal energy transfer portion 40.

After a defined period of time (e.g., 100 milliseconds), thermal energy transfer device 28 may be repositioned into the arrangement shown in FIG. 2. Specifically, thermal energy transfer device 28 may be repositioned in the direction of arrow 32 so that first thermal energy transfer portion 38 is now positioned within energy absorption area 12 and second thermal energy transfer portion 40 is now positioned within second energy dissipation area 20. When positioned in this manner, magnetic field generation device 36 may be energized to generate a magnetic field (not shown) proximate second energy dissipation area 20.

As discussed above, as thermal energy transfer device 28 (and, therefore, first thermal energy transfer portion 38 and second thermal energy transfer portion 40) are constructed of a magnetic field responsive material, thermal energy transfer device 28 (and, therefore, first thermal energy transfer portion 38 and second thermal energy transfer portion 40) may warm when exposed to the magnetic fields (not shown) produced by magnetic field generation devices 34, 36.

Continuing with the above-stated example, as magnetic field generation device 36 is energized, second thermal energy transfer portion 40 may be "warmed" due to the presence of the magnetic field produced by magnetic field generation device 36. For illustrative purposes, the strength of the magnetic field (not shown) generated by magnetic field generation device 36 may be in the range of 2 to 5 Tesla and the amount of "warming" experienced by second thermal energy transfer portion 40 may be in the range of 110 to 260 degrees F. (depending on efficiency of magnetocaloric material).

Accordingly, the thermal energy present in this now "warmer" second thermal energy transfer portion 40 may travel "upward" (in the direction of arrows 52) into thermal energy dissipation device 22. Accordingly and when positioned as shown in FIG. 2, thermal energy dissipation device 22 may wick away thermal energy from this now "warmer" second thermal energy transfer portion 40, resulting in the cooling of second thermal energy transfer portion 40. Additionally, as second thermal energy transfer portion 40 was "warmed" by the magnetic field (not shown) produced by magnetic field generation device 36, the quantity of thermal energy absorbed by thermal energy dissipation device 22 is increased as the temperature of second thermal energy transfer portion 40 decreases.

Additionally and when configured as shown in FIG. 2, first thermal energy transfer portion 38 is positioned within energy absorption area 12. Accordingly, the thermal energy produced by thermal energy producing device 14 may travel upward (in the direction of arrows 50) through conductive plate 48 and into first thermal energy transfer portion 38. Therefore, when positioned as shown in FIG. 2, first thermal energy transfer portion 38 may wick away thermal energy from thermal energy producing device 14, resulting in the cooling of thermal energy produced device 14.

After a defined period of time (e.g., 100 milliseconds), thermal energy transfer device 28 may be repositioned once again into the arrangement shown in FIG. 1. Specifically, thermal energy transfer device 28 may be repositioned in the direction of arrow 30 so that second thermal energy transfer portion 40 is now once again positioned within energy absorption area 12 and first thermal energy transfer portion 38 is now once again positioned within first energy dissipation area 18. When positioned in this manner, magnetic field generation device 34 may be energized to generate a magnetic field (not shown) proximate first energy dissipation area 18.

Further, magnetic field generation device 36 may be deenergized, as second thermal energy transfer portion 40 is no longer positioned within second energy dissipation area 20. Accordingly, any "warming" of second thermal energy transfer portion 40 that occurred due to second thermal energy transfer portion 40 being exposed to the magnetic field produced by magnetic field generation device 36 will be reversed.

As discussed above, as thermal energy transfer device 28 (and, therefore, first thermal energy transfer portion 38 and second thermal energy transfer portion 40) are constructed of a magnetic field responsive material, thermal energy transfer device 28 (and, therefore, first thermal energy transfer portion 38 and second thermal energy transfer portion 40) may warm when exposed to the magnetic fields (not shown) produced by magnetic field generation devices 34, 36.

Continuing with the above-stated example, as magnetic field generation device 34 is energized, first thermal energy transfer portion 38 may be "warmed" due to the presence of the magnetic field produced by magnetic field generation device 34. For illustrative purposes, the strength of the magnetic field (not shown) generated by magnetic field generation device 34 may be in the range of 2 to 5 Tesla and the amount of "warming" experienced by first thermal energy transfer portion 38 may be in the range of 110 to 260 degrees F.

Accordingly, the thermal energy present in this now "warmer" first thermal energy transfer portion 38 may travel "upward" (in the direction of arrows 54) into thermal energy dissipation device 22. Accordingly and when positioned as shown in FIG. 1, thermal energy dissipation device 22 may wick away thermal energy from this now "warmer" first thermal energy transfer portion 38, resulting in the cooling of first thermal energy transfer portion 38. Additionally, as first thermal energy transfer portion 38 was "warmed" by the magnetic field (not shown) produced by magnetic field generation device 34, the quantity of thermal energy absorbed by thermal energy dissipation device 22 is increased.

Additionally and when configured as shown in FIG. 1, second thermal energy transfer portion 40 (which has cooled down up to 40 degree F. compared with the temperature of thermal energy dissipation device 22 due to it no longer being exposed to the magnetic field generated by magnetic field generation device 36) is once again positioned within energy absorption area 12. Accordingly, the thermal energy produced by thermal energy producing device 14 may travel upward (in the direction of arrows 50) through conductive plate 48 and into this now cooler second thermal energy transfer portion 40. Therefore, when once again positioned as shown in FIG. 1, second thermal energy transfer portion 40 may wick away thermal energy from thermal energy producing device 14, resulting in the cooling of thermal energy producing device 14.

Again, after a defined period of time (e.g., 100 milliseconds), thermal energy transfer device 28 may be repositioned once again into the arrangement shown in FIG. 2 (i.e., in the direction of arrow 32) so that first thermal energy transfer portion 38 is now once again positioned within energy absorption area 12 and second thermal energy transfer portion 40 is now once again positioned within second energy dissipation area 20. When positioned in this manner, magnetic field generation device 36 may be energized to generate a magnetic field (not shown) proximate second energy dissipation area 20.

Further, magnetic field generation device 34 may be deenergized, as first thermal energy transfer portion 38 is no longer positioned within first energy dissipation area 18. Accordingly, any "warming" of first thermal energy transfer portion 38 that occurred due to first thermal energy transfer portion 38 being exposed to the magnetic field produced by magnetic field generation device 34 will be reversed.

Continuing with the above-stated example, as magnetic field generation device 36 is energized, second thermal energy transfer portion 40 may be "warmed" due to the presence of the magnetic field produced by magnetic field generation device 36.

Accordingly, the thermal energy present in this now "warmer" second thermal energy transfer portion 40 may travel "upward" (in the direction of arrows 52) into thermal energy dissipation device 22. Accordingly and when positioned as shown in FIG. 2, thermal energy dissipation device 22 may wick away thermal energy from this now "warmer" second thermal energy transfer portion 40, resulting in the cooling of second thermal energy transfer portion 40. Additionally, as second thermal energy transfer portion 40 was "warmed" by the magnetic field (not shown) produced by magnetic field generation device 36, the quantity of thermal energy absorbed by thermal energy dissipation device 22 is increased.

Additionally and when configured as shown in FIG. 2, first thermal energy transfer portion 38 (which has cooled due to it no longer being exposed to the magnetic field generated by magnetic field generation device 34) is once again positioned within energy absorption area 12. Accordingly, the thermal energy produced by thermal energy producing device 14 may travel upward (in the direction of arrows 50) through conductive plate 48 and into this now cooler first thermal energy transfer portion 38. Therefore, when once again positioned as shown in FIG. 2, first thermal energy transfer portion 38 may wick away thermal energy from thermal energy producing device 14, resulting in the cooling of thermal energy producing device 14.

This cycling of thermal energy transfer device 28 between the position shown in FIG. 1 and the position shown in FIG. 2 may continue during operation of thermal energy producing device 14.

Magneto-caloric cooling system 10 may further include third insulating layer 56 that may be positioned between energy absorption area 12 and thermal energy dissipation device 22, which may be configured to reduce the direct flow of thermal energy from energy absorption area 12 to thermal energy dissipation device 22.

Figure 5:
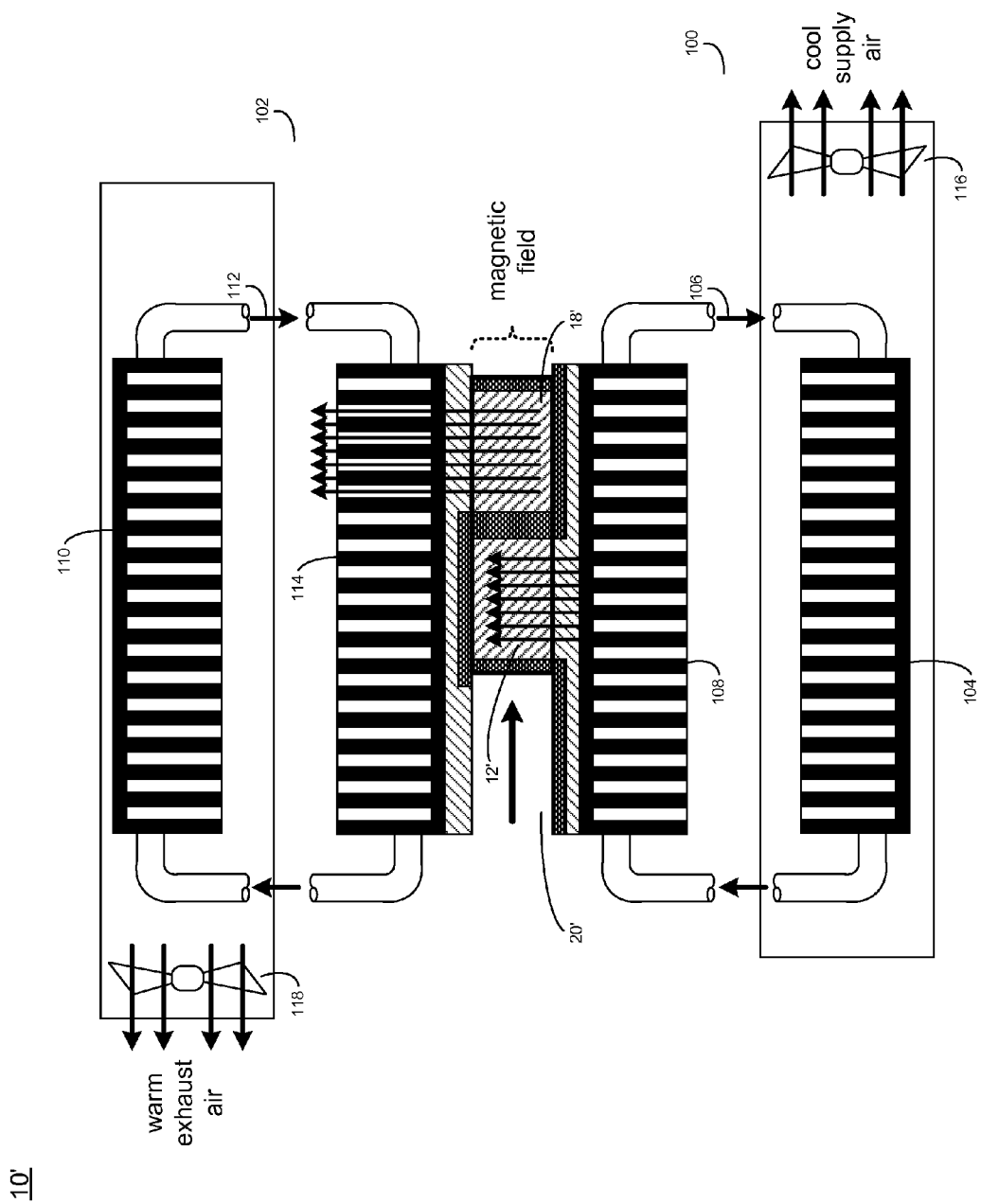
FIG. 5 is an alternative diagrammatic view of the magneto-caloric cooling system of FIG. 4.

Referring also to FIGS. 4-5, there is shown an alternative embodiment of magneto-caloric cooling system 10'. Specifically, magneto-caloric cooling system 10' is shown to include an energy absorption area (i.e. energy absorption area 12') that is configured to be thermally coupled to thermal energy absorbing device 100. Further, magneto-caloric cooling system 10' is shown to include at least one energy dissipation area (e.g., first energy dissipation area 18' and second energy dissipation area 20') that is configured to be thermally coupled to thermal energy dissipation device 102.

Examples of thermal energy absorbing device 100 may include convective heat absorption device 104, which may be configured to circulate a fluid (e.g., coolant 106) which may transfer thermal energy from convective heat absorption device 104 to heat exchanger 108 (which is thermally coupled to energy absorption area 12').

Examples of thermal energy dissipation device 102 may include convective heat dissipation device 110, which may be configured to circulate a fluid (e.g., coolant 112) which may transfer thermal energy from heat exchanger 114 (which is thermally coupled to first energy dissipation area 18' and second energy dissipation area 20') to convective heat dissipation device 110.

Fan assemblies 116, 118 may be configured to move air across thermal energy absorbing device 100 and thermal energy dissipation device 102 (respectively) to enhance the convective characteristics of these devices. For example, fan assembly 116 may provide cool air to a computer chassis and fan assembly 118 may exhaust warm air from the computer chassis.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A magneto-caloric cooling system comprising:
   an energy absorption area configured to be thermally coupled to a thermal energy producing device;
   at least one energy dissipation area configured to be thermally coupled to a thermal energy dissipation device;
   a thermal energy transfer device configured to move in a linear direction between the energy absorption area and the energy dissipation area, wherein the thermal energy transfer device includes a first thermal energy transfer portion and a second thermal energy transfer portion within a single thermal energy transfer device, wherein the first and second thermally energy transfer portions are in contact with and separated by an insulating divider;
   a convective heat absorption device and a convective heat dissipation device, wherein the thermal energy transfer device is configured such that the convective heat absorption device and the convective heat dissipation device are not in fluid communication; and
   a plurality of magnetic field generation devices configured to produce a magnetic field, wherein a first magnetic field generation device produces the magnetic field when the thermal energy transfer device moves within an area of the at least one energy dissipation area corresponding to the first magnetic field generation device and a second magnetic field generation device produces the magnetic field when the thermal energy transfer device moves within an area of the at least one energy dissipation area corresponding to the second magnetic field generation device.

2. The magneto-caloric cooling system of claim 1 wherein the thermal energy dissipation device includes a heat sink.

3. The magneto-caloric cooling system of claim 1 wherein the thermal energy producing device includes an electronic component.

4. The magneto-caloric cooling system of claim 3 wherein the electronic component includes a microprocessor.

5. The magneto-caloric cooling system of claim 1 wherein the thermal energy transfer device is constructed of a magnetic-field-responsive material.

6. The magneto-caloric cooling system of claim 5 wherein the magnetic field responsive material includes a magnetorefrigerant.

7. The magneto-caloric cooling system of claim 6 wherein the magnetorefrigerant includes Gadolinium-based compounds.

8. The magneto-caloric cooling system of claim 1 wherein the thermal energy transfer device is configured to warm when exposed to the magnetic field produced by the plurality of magnetic field generation devices.

9. The magneto-caloric cooling system of claim 1 wherein the first and second thermally energy transfer portions are separated by an insulating divider.

10. The magneto-caloric cooling system of claim 9 further comprising an insulating layer positioned between the energy absorption area and the energy dissipation area.

11. The magneto-caloric cooling system of claim 1 wherein the at least one energy dissipation area includes a first energy dissipation area and a second energy dissipation area.

12. The magneto-caloric cooling system of claim 11 wherein:
the first thermal energy transfer portion is configured to be positioned within the first energy dissipation area while the second thermal energy transfer portion is positioned within the energy absorption area; and
the second thermal energy transfer portion is configured to be positioned within the second energy dissipation area while the first thermal energy transfer portion is positioned within the energy absorption area.

13. A magneto-caloric cooling system comprising:
an energy absorption area configured to be thermally coupled to a thermal energy producing device;
at least one energy dissipation area configured to be thermally coupled to a thermal energy dissipation device, wherein:
the at least one energy dissipation area includes a first energy dissipation area and a second energy dissipation area, and
the thermal energy dissipation device includes a heat sink;
a thermal energy transfer device configured to move in a linear direction between the energy absorption area and the energy dissipation area, wherein the thermal energy transfer device includes a first thermal energy transfer portion and a second thermal energy transfer portion within a single thermal energy transfer device, wherein the first and second thermally energy transfer portions are in contact with and separated by an insulating divider;
a convective heat absorption device and a convective heat dissipation device, wherein the thermal energy transfer device is configured such that the convective heat absorption device and the convective heat dissipation device are not in fluid communication; and a plurality of magnetic field generation devices configured to produce a magnetic field, wherein a first magnetic field generation device produces the magnetic field when the thermal energy transfer device moves within the first energy dissipation area corresponding to the first magnetic field generation device and a second magnetic field generation device produces the magnetic field when the thermal energy transfer device moves within the second energy dissipation area corresponding to the second magnetic field generation device.

14. The magneto-caloric cooling system of claim 13 wherein:
the first thermal energy transfer portion is configured to be positioned within the first energy dissipation area while the second thermal energy transfer portion is positioned within the energy absorption area; and
the second thermal energy transfer portion is configured to be positioned within the second energy dissipation area while the first thermal energy transfer portion is positioned within the energy absorption area.

15. The magneto-caloric cooling system of claim 13 wherein the thermal energy producing device includes an electronic component.

16. A magneto-caloric cooling system comprising:
an energy absorption area configured to be thermally coupled to a thermal energy producing device, wherein the thermal energy producing device includes an electronic component;
at least one energy dissipation area configured to be thermally coupled to a thermal energy dissipation device, wherein the thermal energy dissipation device includes a heat sink;
a thermal energy transfer device configured to move in a linear direction between the energy absorption area and the energy dissipation area, wherein the thermal energy transfer device includes a first thermal energy transfer portion and a second thermal energy transfer portion within a single thermal energy transfer device, wherein the first and second thermally energy transfer portions are in contact with and separated by an insulating divider;
a convective heat absorption device and a convective heat dissipation device, wherein the thermal energy transfer device is configured such that the convective heat absorption device and the convective heat dissipation device are not in fluid communication; and
a plurality of magnetic field generation devices configured to produce a magnetic field, wherein a first magnetic field generation device produces the magnetic field when the thermal energy transfer device moves within an area of the at least one energy dissipation area corresponding to the first magnetic field generation device and a second magnetic field generation device produces the magnetic field when the thermal energy transfer device moves within an area of the at least one energy dissipation corresponding to the second magnetic field generation device.

17. The magneto-caloric cooling system of claim 16 wherein the thermal energy transfer device is constructed of a magnetic-field-responsive material.

18. The magneto-caloric cooling system of claim 17 wherein the magnetic-field responsive material includes a magnetorefrigerant.

19. The magneto-caloric cooling system of claim 18 wherein the magnetorefrigerant includes Gadolinium-based compounds.

* * * * *